(12) United States Patent
Lines

(10) Patent No.: US 11,371,642 B2
(45) Date of Patent: Jun. 28, 2022

(54) INTERNAL INSPECTION OF PIPELINES

(71) Applicant: Subsea 7 Limited, Sutton (GB)

(72) Inventor: David Alexander Lines, London (GB)

(73) Assignee: Subsea 7 Limited, Sutton (GB)

( * ) Notice: Subject to any disclaimer, the term of this patent is extended or adjusted under 35 U.S.C. 154(b) by 0 days.

(21) Appl. No.: 17/046,470

(22) PCT Filed: Apr. 11, 2019

(86) PCT No.: PCT/GB2019/051053
§ 371 (c)(1),
(2) Date: Oct. 9, 2020

(87) PCT Pub. No.: WO2019/197837
PCT Pub. Date: Oct. 17, 2019

(65) Prior Publication Data
US 2021/0088169 A1      Mar. 25, 2021

(30) Foreign Application Priority Data

Apr. 12, 2018   (GB) .................................... 1806037

(51) Int. Cl.
| | |
|---|---|
| *G01L 1/00* | (2006.01) |
| *F16L 55/42* | (2006.01) |
| *G01B 7/00* | (2006.01) |
| *G01L 1/22* | (2006.01) |
| *F16L 101/30* | (2006.01) |

(52) U.S. Cl.
CPC .............. *F16L 55/42* (2013.01); *G01B 7/00* (2013.01); *G01L 1/22* (2013.01); *F16L 2101/30* (2013.01)

(58) Field of Classification Search
CPC ........ F16L 55/42; F16L 2101/30; G01B 7/00; G01L 1/22
See application file for complete search history.

(56) References Cited

U.S. PATENT DOCUMENTS

| | | | | |
|---|---|---|---|---|
| 2,846,662 | A * | 8/1958 | Sparks | ...................... G01V 1/16 367/58 |
| 3,755,908 | A * | 9/1973 | VerNooy | ............... G01M 3/005 33/544.3 |
| 3,973,441 | A | 8/1976 | Porter | |
| 4,098,126 | A * | 7/1978 | Howard | ............... G01B 5/0002 33/544.5 |
| 4,218,923 | A * | 8/1980 | Triplett | .............. G01N 29/2481 73/623 |
| 4,227,309 | A | 10/1980 | Jones | |
| 4,457,073 | A | 7/1984 | Payne | |

(Continued)

FOREIGN PATENT DOCUMENTS

| | | | | |
|---|---|---|---|---|
| DE | 102012009347 | | 11/2013 | |
| EP | 0999428 A1 * | 5/2000 | ............. G01B 7/281 | |

(Continued)

*Primary Examiner* — Max H Noori
(74) *Attorney, Agent, or Firm* — Levy & Grandinetti

(57) ABSTRACT

A pig has a body of resiliently compressible material extending along a central longitudinal axis. At least one strain gauge is embedded in the material of the body. The or each strain gauge extends transversely with respect to the central longitudinal axis and is arranged to deflect and elongate longitudinally with longitudinal deflection of a forward end of the body.

25 Claims, 6 Drawing Sheets

(56) References Cited

U.S. PATENT DOCUMENTS

| | | | | |
|---|---|---|---|---|
| 5,385,049 | A * | 1/1995 | Hunt | F17D 5/00 |
| | | | | 73/866.5 |
| 5,419,203 | A * | 5/1995 | Carmichael | G01F 1/26 |
| | | | | 73/861.58 |
| 7,401,522 | B2 * | 7/2008 | Broden | G01L 13/025 |
| | | | | 73/715 |
| 8,925,400 | B2 | 1/2015 | Hill et al. | |
| 9,599,528 | B2 | 3/2017 | Di Lullo et al. | |
| 10,444,191 | B2 | 10/2019 | Banks et al. | |
| 2007/0240526 | A1 * | 10/2007 | Fowler | G01B 7/16 |
| | | | | 73/862.471 |
| 2010/0308809 | A1 | 12/2010 | Houldley et al. | |
| 2013/0008257 | A1 * | 1/2013 | Ito | G01B 13/24 |
| | | | | 73/784 |
| 2014/0284103 | A1 * | 9/2014 | Niina | E21B 7/067 |
| | | | | 175/24 |
| 2018/0010937 | A1 * | 1/2018 | Bytheway | G01B 7/22 |
| 2020/0173602 | A1 * | 6/2020 | Olsson | H04N 7/183 |
| 2020/0278069 | A1 * | 9/2020 | Xiong | G01B 21/32 |
| 2020/0307024 | A1 * | 10/2020 | Volpato | B29B 7/7652 |
| 2020/0360082 | A1 * | 11/2020 | Shen | A61B 5/0215 |

FOREIGN PATENT DOCUMENTS

| | | |
|---|---|---|
| EP | 2 507 541 | 6/2011 |
| FR | 2331744 | 6/1977 |
| GB | 1 567 167 | 5/1980 |
| GB | 2 429 254 | 2/2007 |
| GB | 2538517 | 11/2016 |
| GB | 2538966 | 12/2016 |
| JP | 2000-310389 | 11/2000 |
| WO | WO 2013/088427 | 6/2013 |

* cited by examiner

INTERNAL INSPECTION OF PIPELINES

This invention relates to the challenges of inspecting the internal geometry of pipes used to form pipelines and piping systems. Such pipes are used in the production of oil and gas, for example in the subsea oil and gas industry.

Oil and gas pipelines transport multiphase fluids that tend to leave solid deposits on the tubular internal wall of the pipeline. Those deposits may comprise sand, muds, hydrates, waxes and/or condensates of asphaltene. As they thicken over time, such deposits can restrict fluid flow along the pipeline and may even, eventually, block it.

A pipeline blockage can of course be extremely disruptive. Remedying such a blockage can be very complex and expensive, especially if the pipeline is located subsea.

Oil and gas may also contain significant quantities of sulphur. Sulphur combines with other elements to promote corrosion of metal pipes, especially those of steel. Changes in the geometry of the internal wall of a pipeline may indicate where such corrosion is taking place.

More generally, other defects or deformities may significantly affect the circularity and internal diameter of a pipeline, such as dents, buckling or excessively-protruding weld roots. Such anomalies can indicate points of weakness and may block the movement of pigs along the pipeline for cleaning or for other purposes.

As a subsea pipeline typically has a working life of more than twenty years, it is necessary to detect internal anomalies and to clean deposits from the bore of the pipeline from time to time.

A common way of inspecting a pipeline from within is to propel a Pipeline Inspection Gauge—generally known in the art as a 'pig' and also known as a calliper pig—along the pipeline. Such pigs may, optionally, comprise additional tools or instruments. They detect constriction or narrowing of the internal lumen of a pipeline before diagnostic or cleaning pigs are launched into the pipeline to investigate or to remedy the apparent defect.

In use, pigs are injected into and propelled along a pipeline by fluid pressure. Specifically, a pressure differential is created within the pipeline between a volume ahead of the pig and a volume behind the pig, with respect to the intended direction of travel. Thus, a pig is driven along a pipeline from a pig launcher to a pig receiver by a pressure differential in the pipeline between upstream and downstream sides of the pig.

Pigs may have various shapes of circular cross-section, such as spheres, cylinders or dumbbells. Their outer diameter is selected to be a sliding fit within the interior of the pipeline so as to maintain the necessary pressure differential. Commonly, a pig has a series of annular circumferential seals, cups or discs that separate the volume within the pipeline ahead of the pig from the volume within the pipeline behind the pig.

There are various approaches to the design of inspection pigs that travel along a pipeline to detect defects. For example, FR 2331744 teaches the use of an accelerometer that senses deceleration of a pig caused by abnormal friction with the internal pipeline wall.

More conventionally, inspection pigs may be fitted with contact sensors to bear against the internal pipeline wall. For example, GB 1567167 discloses a pig with contact sensors that are biased outwardly around the periphery of a cup.

The pig disclosed in DE 102012009347 also has multiple contact sensors arranged around its circumference. Similarly, US 2010/308809 discloses a spring-bias sensor arm that is carried on a body of a pig between longitudinally-spaced cups. The sensor arm travels with the pig along, and in contact with, the internal pipeline wall. However, contact sensors make a pig complex to manufacture and may wear quickly.

In another inspection pig disclosed in U.S. Pat. No. 4,457,073, cups or discs are mounted on a central shaft. The cups or discs are resiliently flexible and therefore slightly elastic. Their deformation as the pig travels over defects in the pipeline wall is transmitted mechanically to a measurement system, thus allowing direct inspection of the pipeline bore. This arrangement also suffers from complexity.

WO 2013/088427 discloses an inspection pig in which strain gauges are mounted on fingers spaced angularly around a central longitudinal axis. The arrays of fingers are used only for measurement. In view of the gaps between the fingers, additional discs are required to maintain the pressure differential that propels the pig. Similarly, GB 2429254 describes a pig comprising radially extending arms that contact the internal surface of the pipe and deflect upon contact with an obstruction.

Furthermore, US 2015/059498 describes a pig for determining the internal condition of a pipeline and of the fluid flowing within the pipeline. The pig comprises a pH sensor and a salinity sensor for monitoring the fluid conditions within the pipeline and an array of radially extending petals. The petals comprise deformation and roughness sensors and are configured to contact the internal surface of the pipeline.

U.S. Pat. No. 4,227,309 discloses a pig in which resistive strain gauges are mounted to a flexible disc-shaped gauging plate to detect how that plate bends on encountering obstructions on the internal wall of a pipeline. The gauging plate comprises a flexible plastics film on which strain gauges are bonded, sandwiched between two moulded layers of flexible material.

It will be apparent that the most widespread pig designs incorporate discs or cups. However, discs or cups have limited elasticity and radial compressibility. This makes such pigs unable to cope with a substantial reduction in the internal diameter of a pipeline, as may result from a significant build-up of deposits.

Consequently, there is a risk that pigs fitted with discs or cups may become jammed in a pipeline. It is difficult to free a jammed pig, especially if the pipeline is installed in deep water. Meanwhile, the pipeline is blocked by the jammed pig and so cannot be used.

Pigs are also known that comprise a single block of material such as polyurethane foam. Such materials may be more readily compressed in a radial direction than the discs or cups of conventional pig designs. For example, GB 2538966 discloses various materials for making highly-compressible pigs.

Foam pigs may be adapted for inspection by incorporating an internal cavity for housing sensors. For example the pig disclosed in JP 2000310389 contains a camera and related electronic circuits to record and send a video signal.

EP 2507541 discloses a foam pig containing electromagnetic sensors that allow the radial distance between the core of the pig and points in the same cross-section to be measured. The diameter of the pig is inferred from this distance, with knowledge of the elasticity characteristics of the foam. However, this solution cannot detect localised defects in an internal pipeline wall.

In GB 2538517, eddy currents are generated in the pipeline wall and measured by electromagnetic sensors carried by a flexible pig. This solution requires a permanent cable to supply power, noting that electromagnetic power losses in the pipeline wall can be huge.

Against this background, the present invention resides in a pig for internal pipeline inspection that comprises: a body of resiliently-compressible material extending along a central longitudinal axis; and at least one strain gauge embedded in the material of the body, the or each strain gauge extending transversely with respect to the central longitudinal axis.

Preferably, the body is radially compressible by at least 30% of its original diameter without plastic deformation.

The or each strain gauge may extend substantially radially with respect to the central longitudinal axis. There may be at least one array of strain gauges angularly spaced from each other about the central longitudinal axis. Further, the or each strain gauge suitably extends in a plane that is substantially orthogonal to the central longitudinal axis.

The or each strain gauge is preferably arranged to deflect and elongate longitudinally with longitudinal deflection of a portion of the body forward of the or each strain gauge. In particular, the or each strain gauge may be arranged to deflect and elongate longitudinally with longitudinal deflection of a forward end of the body. Thus, the or each strain gauge may be offset longitudinally toward the forward end of the body and may be embedded under a forward end face of the body.

In preferred embodiments, the body is substantially cylindrical and defines an overall length and width of the pig.

The body may be a block of foam or gel and may be of a shape memory material.

The body suitably also contains circuitry for receiving signals from the or each strain gauge. That circuitry may be arranged to process, store and/or transmit data representative of the signals received from the or each strain gauge. Further, the or each strain gauge is preferably activated or energised by an on-board power unit.

The circuitry preferably lies on the central longitudinal axis. An extensible link may be provided between the circuitry and the or each strain gauge, and/or between functional units of the circuitry.

The inventive concept extends to various methods of making a pig for internal pipeline inspection. One such method comprises: suspending or otherwise supporting at least one strain gauge, and optionally also circuitry for receiving signals from the or each strain gauge, in a mould extending transversely with respect to a central longitudinal axis of the mould; submerging the or each strain gauge in a liquid matrix material; and setting the matrix material to form a resiliently-compressible body of the pig that embeds the or each strain gauge.

Another such method comprises: inserting at least one strain gauge into a recess in a resiliently-compressible block, the or each strain gauge extending transversely with respect to a central longitudinal axis of the block; submerging the or each strain gauge in a liquid matrix material introduced into the recess; and setting the matrix material in the recess to form a resiliently-compressible body of the pig that embeds the or each strain gauge.

Another such method comprises: inserting a unit into a passageway in a resiliently-compressible block, the unit being arranged to provide power or to receive strain gauge signals; connecting the inserted unit to at least one strain gauge that is embedded in the block and that extends transversely with respect to a central longitudinal axis of the block; and closing the passageway behind the unit to form a resiliently-compressible body of the pig.

Thus, the invention provides a way of locating and defining the nature of severe internal pipeline changes in an enclosed space such as a pipeline or piping system. To do so, the invention provides a flexible 'smart' calliper pig that may comprise:

a flexible body with shape memory;
one array or multiple arrays of strain gauges;
a processing unit to receive signals from the or each gauge array;
a data recording unit to store signals from the processing unit;
a power unit to power the strain gauges, the processing unit and the data recording unit; and
a power activation device or switch that may be triggered manually or automatically. Automatic triggering may be in response to lapse of time or to exposure of the pig to light or to pressure.

When casting the body of a flexible pig, the or each gauge array and the electronic components may be suspended in a mould until a liquid matrix poured into the mould has set.

The result enables a method of mapping the interior of a pipe system, showing in a digital format the internal profile and changes in the internal profile due to any unexpected shape defects, weld roots, wax deposits, obstructions and so on. This is particularly valuable in cases of existing pipelines where wax deposits have created a change in internal diameter but the severity and exact location of the deposits are unknown.

Embodiments of the invention provide an internal pipeline inspection device that comprises: a compressible pig; and at least one strain gauge embedded into the pig in a substantially radial direction. The pig may, for example, comprise a block of foam or gel.

The or each strain gauge may be arranged to elongate when the pig is at least partially radially compressed. For example, the or each strain gauge may follow a radial direction with longitudinal deflection in order to elongate in the longitudinal direction when the pig is radially compressed.

The pig may comprise a plurality of strain gauges arranged in at least one array of gauges in a star pattern in transverse cross section around a central axis of the pig.

The or each strain gauge may be a fibre-optic strain gauge or may comprise a composite wire or thread, for example of carbon thread or conductive thread (CT) with a polydimethylsiloxane (PDMS) elastomer.

The pig may comprise a processing and recording unit that records strain gauge data and information relating to travel of the pig along a pipeline.

The pig may comprise a communications unit that transfers data to a receiver. Such a communications unit may use ultrasound or electromagnetic waves. The pig may also comprise an autonomous power source.

The pig may be compressed by at least 30% of its original diameter without damage or permanent deformation.

Embodiments of the invention also provide a configuration for a sensor array in a compressible inspection pig. That configuration comprises at least two sensors that are embedded radially into the pig in order to elongate longitudinally when the pig is compressed.

In order that the invention may be more readily understood, reference will now be made, by way of example, to the accompanying drawings, in which.

Figure 1:
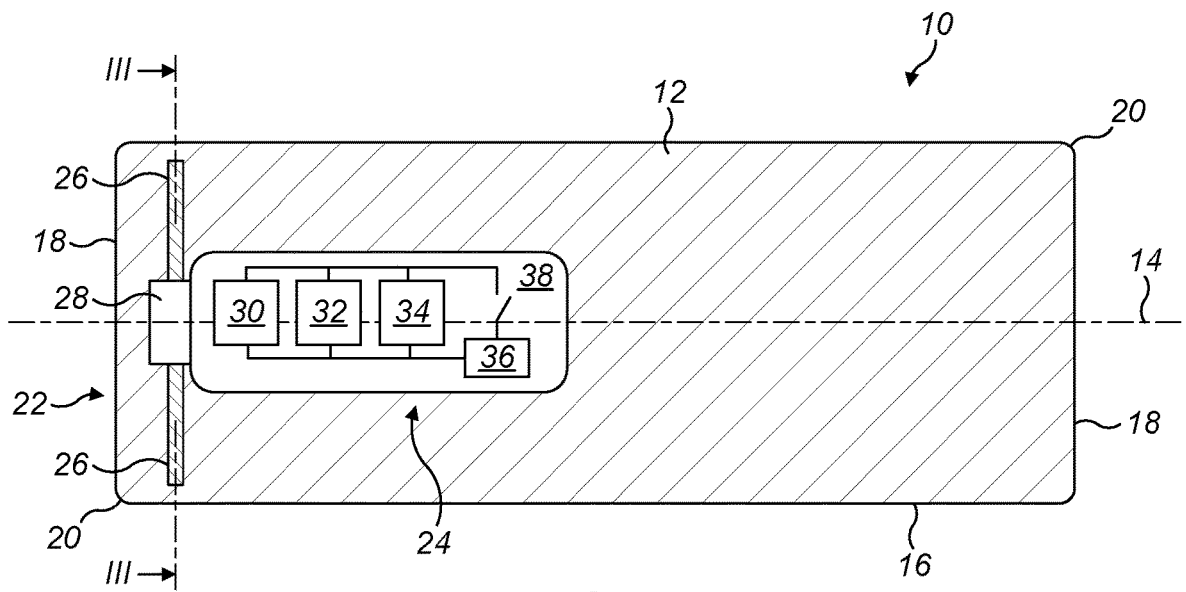
FIG. 1 is a schematic side view of a pig of the invention, in longitudinal section.
Figure 2:
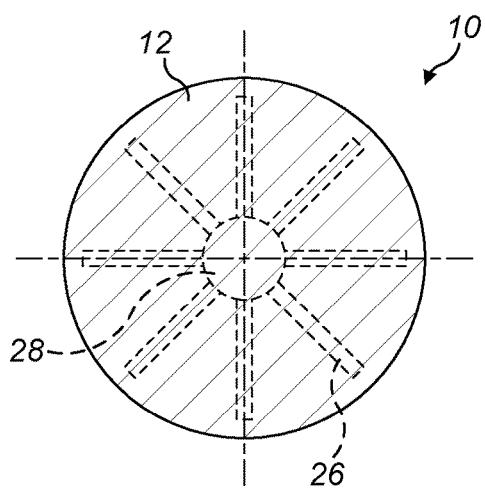
FIG. 2 is an end view of the pig of FIG. 1.
Figure 3:
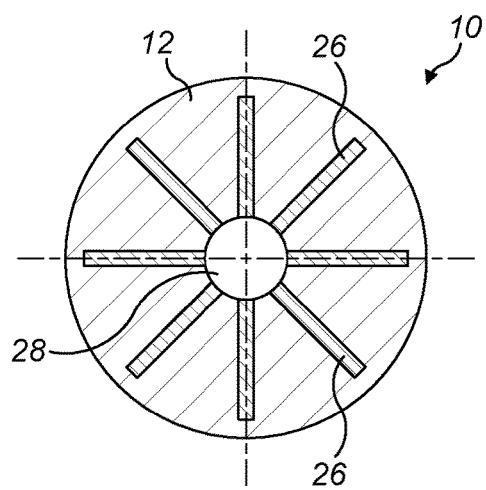
FIG. 3 is a cross-sectional view of the pig taken on line III-III of FIG. 1.

Referring firstly to FIGS. 1 to 3 of the drawings, a pipeline pig 10 of the invention comprises a body 12 that is defined by a resiliently-flexible cylindrical block. The body 12 is generally circular in cross-section, being rotationally symmetrical around a central longitudinal axis 14.

The body 12 has a side wall 16 that is curved around, and substantially parallel to, the central longitudinal axis 14. The body 12 also has generally circular end faces 18 at its forward and rearward ends. The end faces 18 lie in respective planes that are substantially orthogonal to the central longitudinal axis 14 and hence are generally parallel to each other. Each end face 18 is surrounded by a circumferential peripheral edge 20 where it joins the side wall 16.

The body 12 may be cast or moulded from a polymer foam or gel known for making pipeline pigs of this general type. For example, the body may be made from shape memory materials as recited in the aforementioned GB 2538966 or as exemplified in gel pigs such as EVO-Pig sold by Aubin Group (trade marks acknowledged). Other types of viscoelastic materials known in the art may be used.

The body 12 contains and embeds a sensor array 22 and a circuitry package 24. The package 24 is connected to the sensor array 22 to energise the sensor array 22 and to receive and process signals from the sensor array 22. As will be explained, the sensor array 22 emits signals in response to deflection of the flexible body 12 on encountering an obstruction or other dimensional anomaly as the pig 10 moves within a pipe or pipeline in use.

The sensor array 22 and the package 24 are centred on the central longitudinal axis 14 of the body 12 and are offset longitudinally toward the forward end face 18 of the body 12. The package 24 is elongate and extends along the central longitudinal axis 14, substantially parallel to the surrounding side wall of the body 12.

The package 24 should be as narrow as possible to avoid undue restriction of the compressibility of the body 12 in a radially-inward direction. In this respect, the body 12 may be compressed or squeezed elastically by at least 30% of its original diameter without damage or permanent deformation. The package 24 should also be as short as possible in a longitudinal direction so that it will not unduly restrict the flexibility of the pig 10 to follow a curved path, for example to negotiate a bend in a pipe or pipeline.

Preferably, as shown, the sensor array 22 is buried in the body 12 just under the end face 18 at the forward end of the body 12. Conveniently, the package 24 may then be situated rearwardly behind the sensor array 22 as shown.

The sensor array 22 comprises finger-like strain gauges 26 that extend radially from, and are angularly spaced about, a central hub 28. Thus, the sensor array 22 has a petaloid, star-like or fan-like arrangement when viewed along the central longitudinal axis 14. Preferably, as best seen in FIG. 3, the strain gauges 26 are equi-angularly spaced about the hub 28. In this example, the hub 28 of the sensor array 22 is attached rigidly to an end of the package 24.

The strain gauges 26 may be of a fibre-optic type or may comprise a composite wire or thread, for example of CT/PDMS.

When the pig 10 is in an undistorted rest state as shown in FIG. 1, the strain gauges 26 lie substantially in a common plane that is orthogonal to the central longitudinal axis 14. That plane is substantially parallel to the adjacent end face 18 at the forward end of the body 12.

The package 24 contains: a processing unit 30 to receive and process signals from the sensor array 22; a data recording unit 32 to store processed signals from the processing unit 24; and a communications unit 34 to transfer the stored data wirelessly to a suitable receiver.

The package 24 further contains a power unit 36 to provide electrical power to the sensor array 22, the processing unit 30, the data recording unit 32 and the communications unit 34. A switch 38 enables the package 24 to be activated manually or automatically at an appropriate time or place, for example when the pig 10 is about to be launched, and so prevents premature depletion of energy stored in the power unit 36.

Turning next to FIGS. 4a, 4b and 5a to 5c, these drawings show the pig 10 travelling along a pipeline 40. The diameter of the body 12 of the pig 10 is selected to be a close sliding fit within the pipeline 40.

When the pig 10 is relaxed or uncompressed in a rest state, the diameter of its body 12 could be slightly greater than the internal diameter of the pipeline 40. Thus, when the pig 10 is in the pipeline 40, the body 12 may be under slight radially-inward compression from the internal wall of the pipeline 34. This ensures that the side wall 16 of the body 12 bears consistently against the internal wall of the pipeline 40 as the pig 10 travels along the pipeline 34.

Figure 4A:
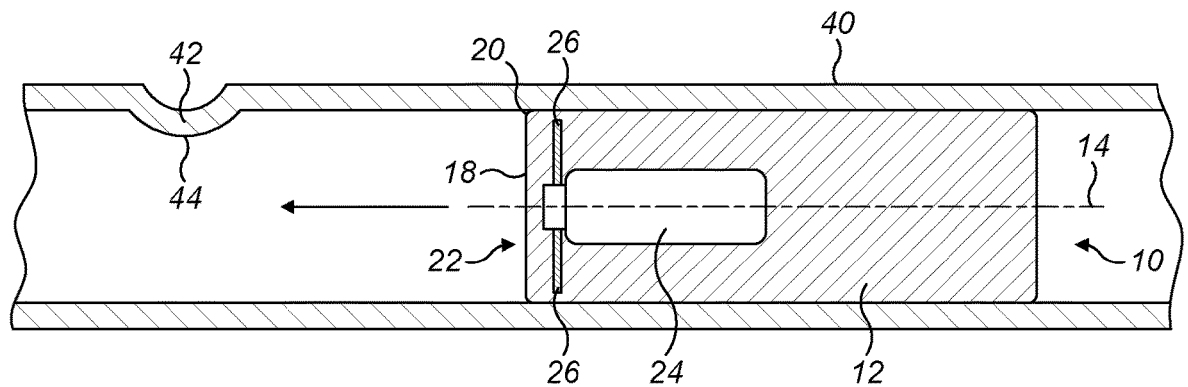
FIGS. 4a and 4b are schematic sectional side views of a pig of FIG. 1 travelling along a pipeline and encountering an isolated defect that affects the internal profile of the pipeline.
Figure 4B:
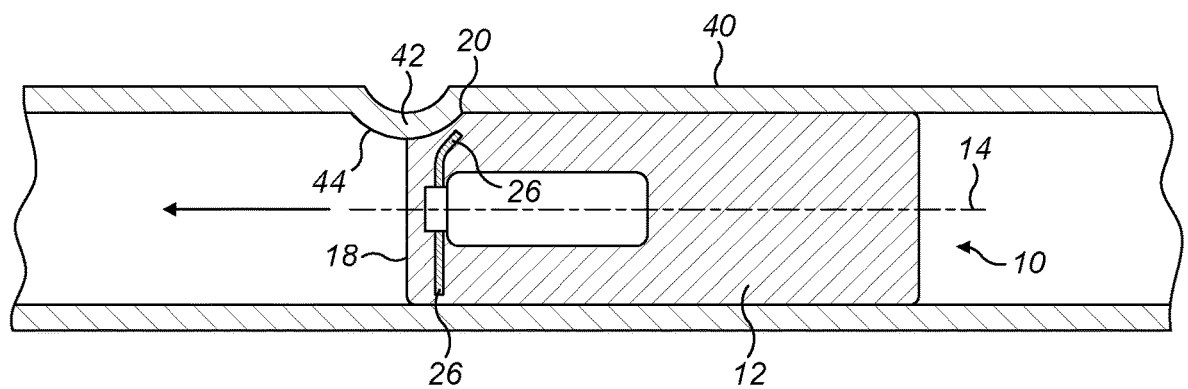

FIGS. 4a and 4b show how the pig 10 reacts to encountering an isolated defect 42 that affects the internal profile of the pipeline 40. In this case, the defect 42 is attributed to a dent that could have been caused by a heavy object such as an anchor being dropped onto the pipeline 40 from above.

The dent-shaped defect 42 is characterised by a bulge 44 that protrudes radially inwardly from the surrounding internal wall of the pipeline 40. The bulge 44 affects less than half of the circumference of the pipeline 40 and so is localised to one side of the pipeline 40.

The pig 10 is shown approaching the bulge 44 in FIG. 4a. When the end face 18 at the forward end of the pig 10 encounters the bulge 44 as shown in FIG. 4b, the body 12 distorts locally to conform to the shape of the bulge 44. The body 12 flows in a fluid-like manner around the bulge 44 as the pig 10 continues to move along the pipeline 40.

A portion of the body 12 that is diametrically opposed to the bulge 44 about the central longitudinal axis 14 continues to move forwardly past the bulge 44. In effect, therefore, resistance of the bulge 44 pulls back a corresponding portion of the peripheral edge 20 around the forward end face 18, relative to the remainder of the body 12 on the opposite side of the central longitudinal axis 14. Thus, the forward end face 18 of the pig 10 is bent out of its original plane.

As a consequence of this localised distortion of the forward end face 18, some of the strain gauges 26 of the sensor array 22 are also bent out of their plane that was originally parallel to the forward end face 18. To varying extents, these deflected strain gauges 26 lengthen, at least in a longitudinal direction even if they may shorten in a radial direction. However, other strain gauges 26 of the sensor array 22, especially on the opposite side of the central longitudinal axis 14, are bent less, or not at all.

By virtue of the resilient shape-memory material of the body 12, the forward end of the body 12 will return quickly to its original width or thickness after passing the bulge 44. Consequently, the deflected strain gauges 26 of the sensor array 22 will return to their planar configuration.

By monitoring individual signals from all of the strain gauges 26, the processing unit 30 can deduce which of the strain gauges 26 are deflected more than others, and to what extent, and can therefore determine the angular extent and radially-inward protrusion of the bulge 44.

Also, using techniques known to those skilled in the art, it is possible to track the orientation of the pig 10 about the central longitudinal axis 14 and the longitudinal position of the pig 10 with respect to the length of the pipeline 40. In that case, the angular position and the longitudinal position of the bulge 44 relative to the pipeline 40 as a whole can be determined by correlation. The longitudinal extent of the bulge 44 can also be determined in this way.

Figure 5A:
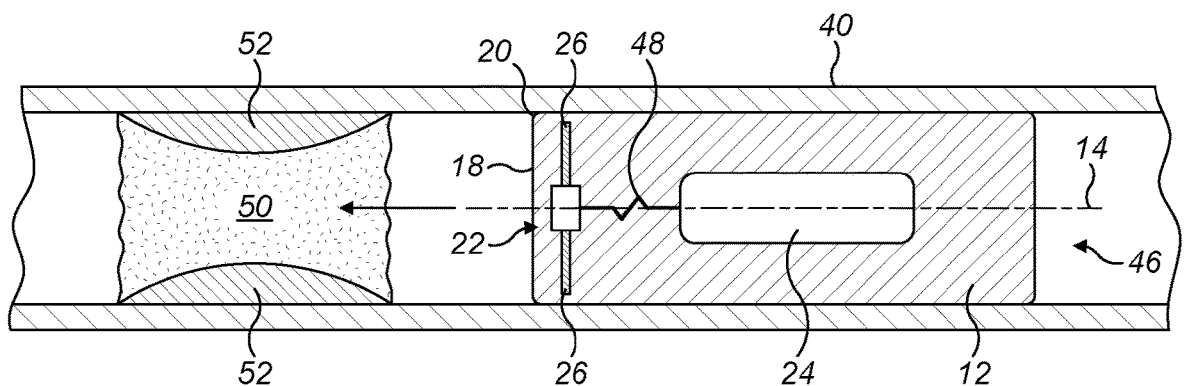
FIGS. 5a to 5c are schematic sectional side views of a variant of the pig of FIG. 1 travelling along a pipeline and encountering a deposit that substantially narrows the interior of the pipeline.
Figure 5B:
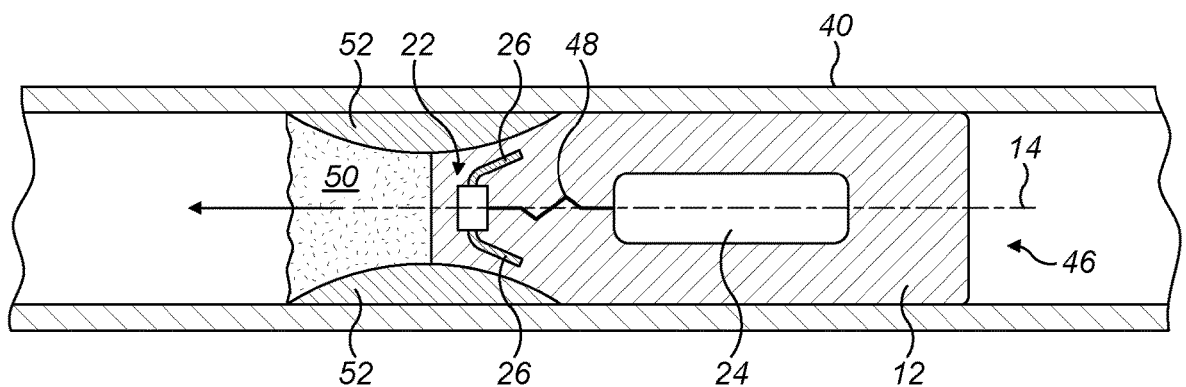
Figure 5C:
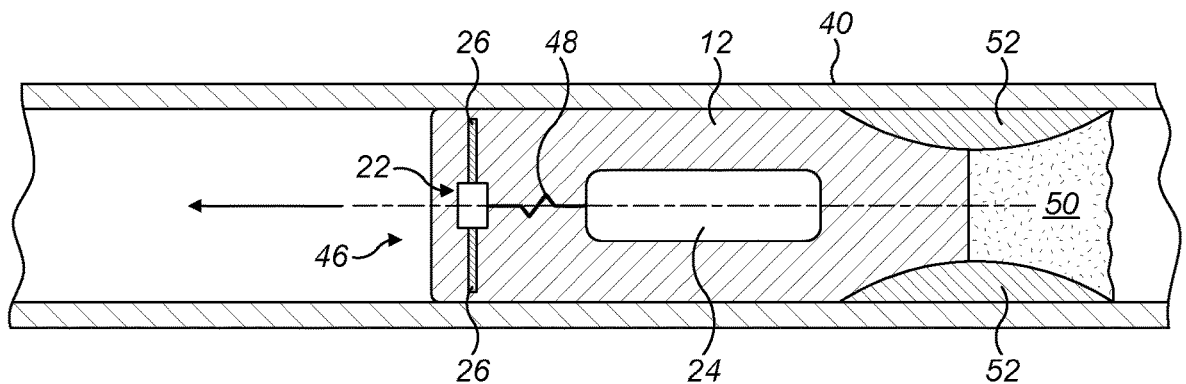

FIGS. 5a to 5c show a variant of the invention in the form of a pig 46 in which the sensor array 22 is connected to the package 24 by a flexible and extensible link 48. So, unlike in the pig 10 of the preceding embodiment, the sensor array 22 is not fixed rigidly to the package 24 but is instead articulated. Thus, the sensor array 22 and the package 24 are free to move relative to each other when suspended in the surrounding flexible matrix of the body 12.

Allowing relative longitudinal movement between the sensor array 22 and the package 24 in this way facilitates longitudinal extension of the body 12 in response to radial narrowing of the body 12. This maximises the radial compressibility of the body 12 and minimises the force required to achieve a given reduction in the width or thickness of the body 12.

The same principle of articulation could be applied to connecting other functional units within the body 12 to allow relative movement between them. For example, any two or more of the processing unit 30, the data recording unit 32, the communications unit 34 and/or the power unit 36 could be connected by flexible or extensible links. In addition to facilitating longitudinal extension of the body 12, this also facilitates bending of the body 12 along its length to follow a curved path.

In FIGS. 5a to 5c, the pig 46 is shown approaching, entering and exiting a constriction 50 caused by deposits 52 of wax or other solids on the inner wall of the pipeline 40.

As the forward end of the pig 46 enters the constriction 50 as shown in FIG. 5b and hence narrows, the body 12 of the pig 46 lengthens slightly. This localised lengthening extends the extensible link 48 between the sensor array 22 and the package 24.

In this example, the constriction 50 is approximately symmetrical around the interior of the pipeline 40. Thus, as the forward end of the pig 46 enters the constriction 50, the entire peripheral edge 20 around the forward end face 18 of the body 12 is pushed back by the deposits 52 to a similar extent. Consequently, all of the strain gauges 26 of the sensor array 22 are bent out of their original plane to a similar extent as shown in FIG. 5b. Again, these deflected strain gauges 26 lengthen in a longitudinal direction even if they shorten in a radial direction.

After squeezing through the constriction 50 as shown in FIG. 5c, the forward end of the body 12 quickly returns resiliently to its original width or thickness. Consequently, the forward end face 18 of the body 12 returns to a planar shape with an orientation that is substantially orthogonal to the direction of travel. This returns the strain gauges 26 of the sensor array 22 to their original plane behind the forward end face 18.

The remaining drawings illustrate various ways in which a pig 10 as shown in FIGS. 1 to 4b can be made.

In FIGS. 6a to 6d, the sensor array 22 and the package 24 of the pig 10 are embedded together as a unit 54 by being immersed in a liquid matrix 56 that subsequently cures to form the body 12.

Figure 6A:
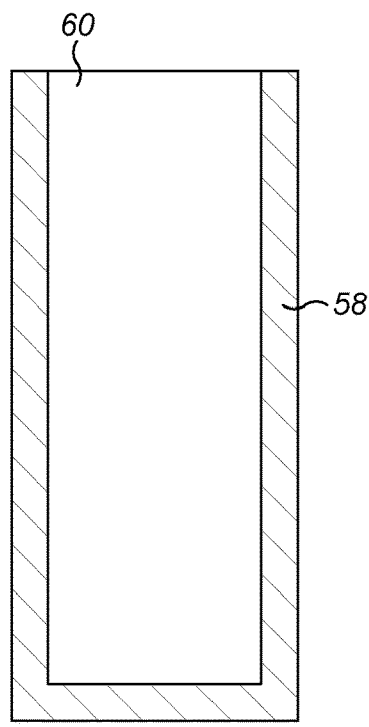
FIGS. 6a to 6d are a sequence of schematic sectional side views that show how a pig of FIG. 1 may be made.

A hollow cylindrical open-topped mould 58 is shown in FIG. 6a. The mould 58 has an internal cavity 60 whose shape and diameter correspond to the shape and diameter required for the body 12.

Figure 6B:
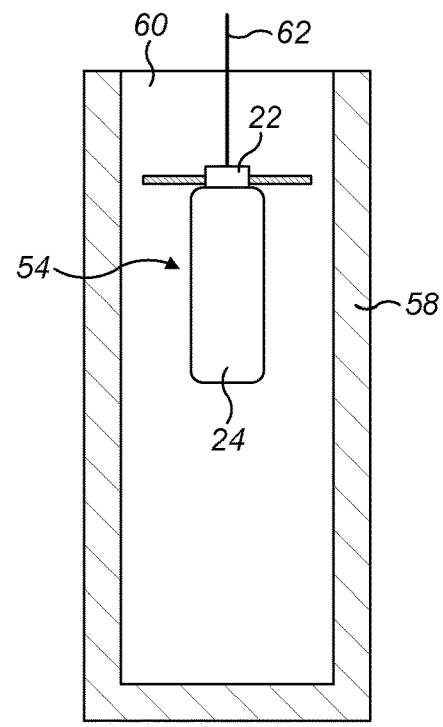

FIG. 6b shows the unit 54 suspended centrally inside the cavity 60 of the mould 58 at the lower end of a rigid rod 62. The distance between the unit 54 and the bottom of the cavity 60 is set to determine the longitudinal position of the unit 54 within the finished pig 10.

Figure 6C:
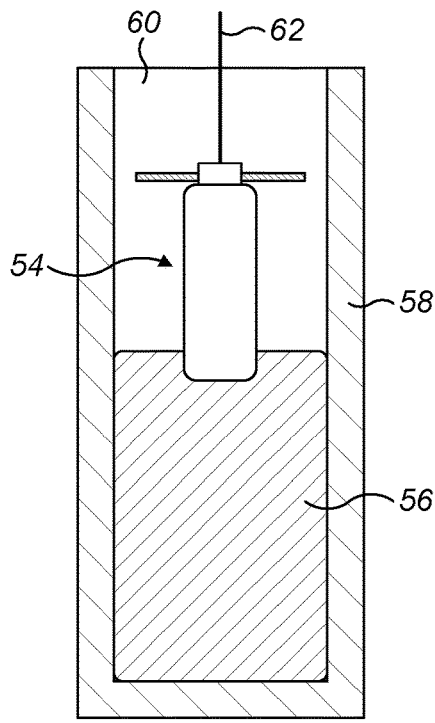
Figure 6D:
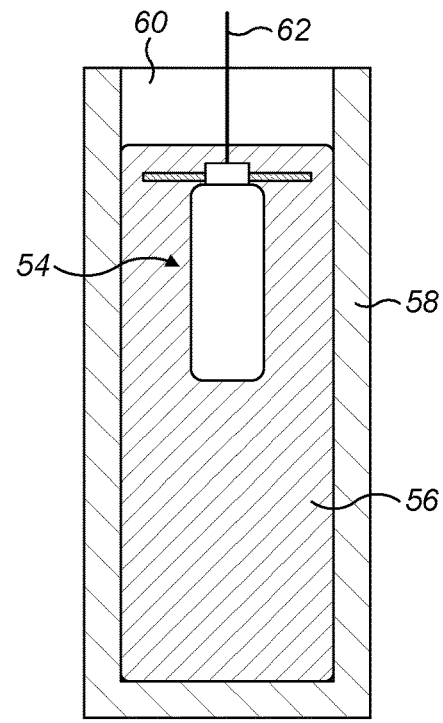

FIG. 6c shows the cavity 60 partially filled by the liquid matrix 56, which may conveniently be poured in through the open top of the mould 58. The liquid matrix 56 has started to immerse the unit 54. Finally, FIG. 6d shows the unit 54 fully immersed in the liquid matrix 56, which can now be left to cure and set to self-supporting stiffness to form the body 12 of the pig 10. When the liquid matrix 56 has cured sufficiently, the rod 62 can be pulled to pull the pig 10 out through the open top of the mould 58.

Figure 7A:
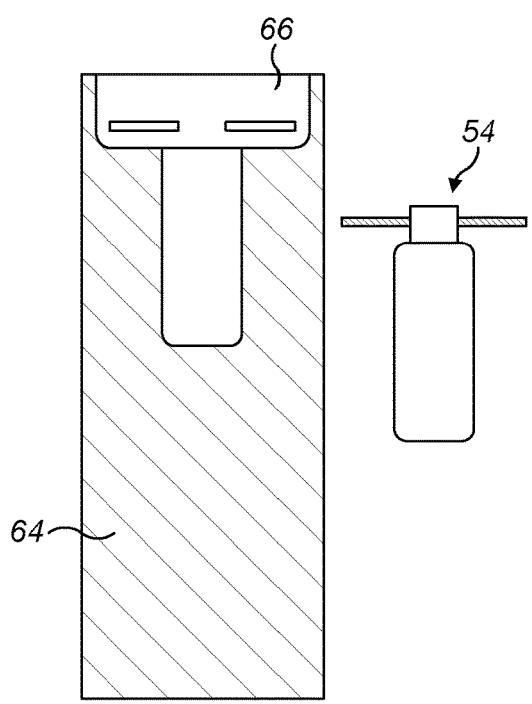
FIGS. 7a to 7d are a sequence of schematic sectional side views that show another way of making a pig of FIG. 1.

FIGS. 7a to 7d show another approach to embed the unit 54 in the body 12 of a pig 10. Here, as shown in FIG. 7a, a pre-moulded cylindrical block 64 of shape-memory foam or gel has a pre-formed recess 66 that opens to one end. The recess 66 is shaped to complement and to fit closely around the unit 54.

The block 64 and the recess 66 may conveniently be formed in a mould 58 like that shown in FIG. 6a, containing a male mould insert that is shaped to form the recess 66.

Figure 7B:
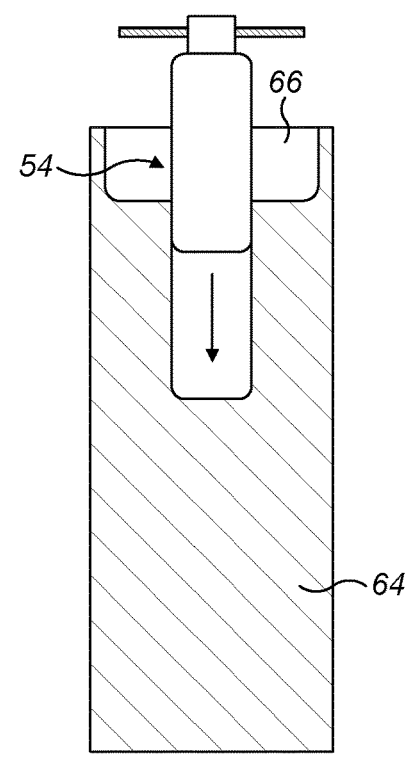
Figure 7C:
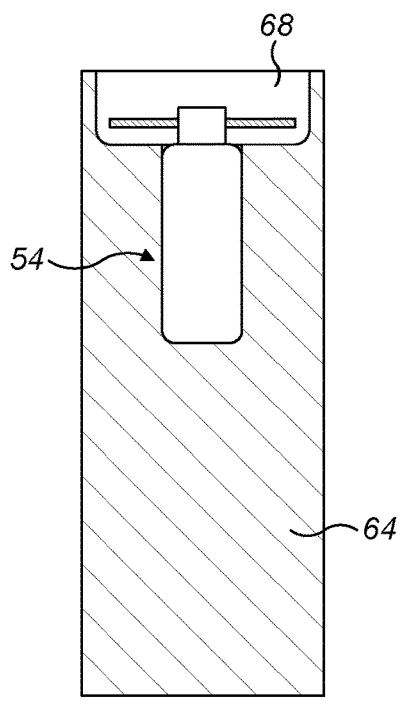
Figure 7D:
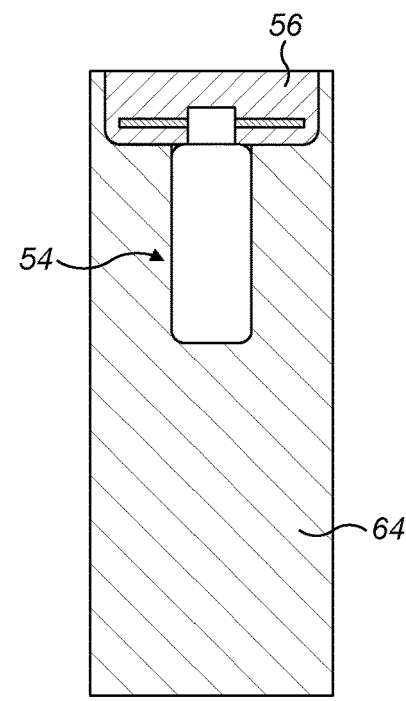

The unit 54 is shown in FIG. 7b being inserted into the recess 66 and in FIG. 7c fully inserted into and engaged with the recess 66. This leaves a gap 68 that is subsequently filled with liquid matrix 56. The liquid matrix 56 submerges and embeds the unit 54, bonds to the compatible and preferably identical material of the block 64 and, as it cures, locks the unit 54 into what is now a completed body 12.

In a variant of the arrangement shown in FIGS. 7a to 7d, a pre-moulded cover piece could be bonded to the block 64 to fill the gap 68 over the unit 54 and to complete the body 12. Again, the material of the cover piece should be compatible and preferably identical to the material of the block 64.

Figure 8A:
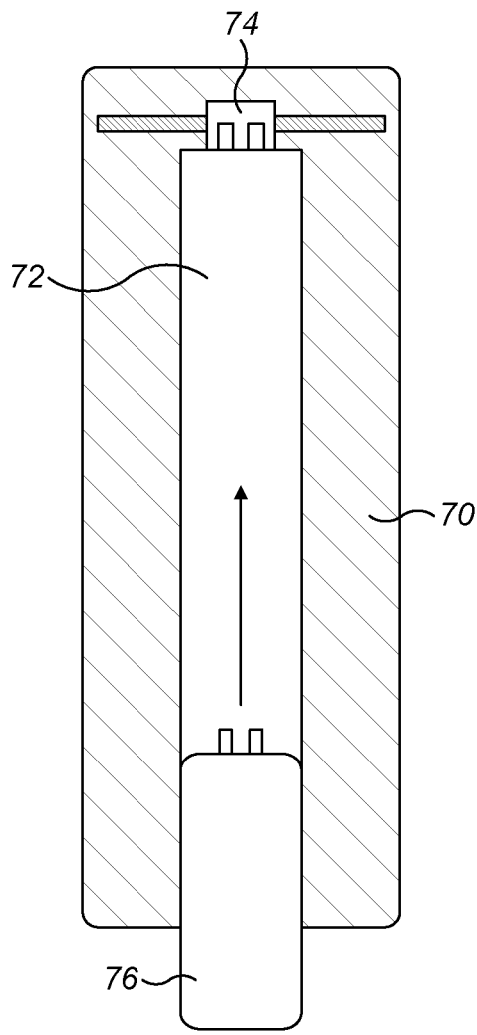
FIGS. 8a and 8b are a sequence of schematic sectional side views that show how a further variant of the pig of FIG. 1 may be made.
Figure 8A:
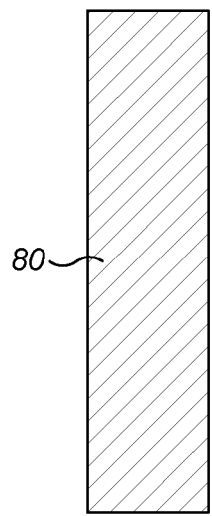
Figure 8B:
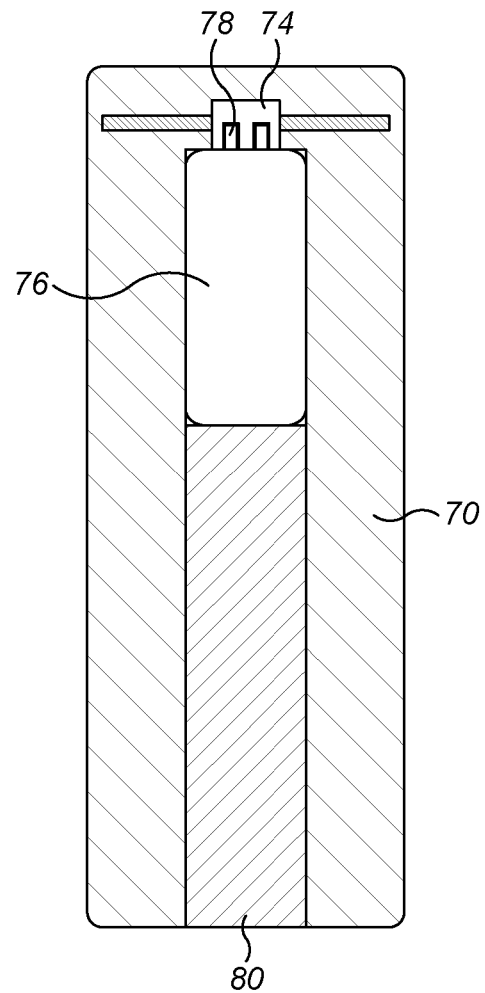

Turning finally to FIGS. 8a and 8b, these drawings show a further variant in which the body 12 of a pig 10 comprises a pre-moulded cylindrical block 70 of shape-memory foam or gel. The block 70 contains a central longitudinal passageway 72 that extends into the block 70 from a rearward end and that terminates at a sensor array 74 pre-embedded near a forward end of the block 70.

Again, the block 70 and the passageway 72 may conveniently be formed in a mould 58 like that shown in FIG. 6a, containing a male mould insert that is shaped to form the passageway 72.

A circuitry package 76 may be inserted into the passageway 72 as shown in FIG. 8a to connect electrically with the sensor array 74 by virtue of complementary interface formations 78. Then, as shown in FIG. 8b, the remainder of the passageway 72 behind the package 76 is filled with a bung or plug 80 that is bonded to the surrounding material of the block 70. The material of the plug 80 is compatible with and preferably identical to the material of the block 70.

In another approach, the remainder of the passageway 72 behind the package 76 may be filled with a liquid matrix 56 like that of FIGS. 6a to 6d and 7a to 7d.

It is also possible for the sensor array 74 and the circuitry package 76 to be embedded in the block 70 at the end of the passageway 72 and for a power unit such as a battery to be inserted into the passageway 72 to be connected to the package 76.

Many other variations are possible within the inventive concept. For example, the body of the pig may be shaped such that one or both ends is tapered or rounded. More generally, at least one end of the pig may have convex or concave curvature.

The invention claimed is:

1. A pig for pipeline inspection, comprising:
   a body of resiliently-compressible material extending along a central longitudinal axis; and
   at least one strain gauge embedded in the material of the body, the or each strain gauge extending transversely with respect to the central longitudinal axis;
   wherein the pig is configured to move through a pipeline to inspect the pipeline.

2. The pig of claim 1, wherein the or each strain gauge extends substantially radially with respect to the central longitudinal axis.

3. The pig of claim 1, comprising at least one array of strain gauges angularly spaced from each other about the central longitudinal axis.

4. The pig of claim 1, wherein the or each strain gauge extends in a plane that is substantially orthogonal to the central longitudinal axis.

5. The pig of claim 1, wherein the or each strain gauge is arranged to deflect and elongate longitudinally with longitudinal deflection of a portion of the body forward of the or each strain gauge.

6. The pig of claim 5, wherein the or each strain gauge is arranged to deflect and elongate longitudinally with longitudinal deflection of a forward end of the body.

7. The pig of claim 6, wherein the or each strain gauge is offset longitudinally toward the forward end of the body.

8. The pig of claim 7, wherein the or each strain gauge is embedded under a forward end face of the body.

9. The pig of claim 1, wherein the body is substantially cylindrical.

10. The pig of claim 1, wherein the body defines an overall length and width of the pig.

11. The pig of claim 1, wherein the body is a block of foam or gel.

12. The pig of claim 1, wherein the body is of a shape memory material.

13. The pig of claim 1, wherein the body further contains circuitry for receiving signals from the or each strain gauge.

14. The pig of claim 13, wherein the circuitry is arranged to process, store and/or transmit data representative of the signals received from the or each strain gauge.

15. The pig of claim 13, wherein the circuitry lies on the central longitudinal axis.

16. The pig of claim 13, comprising an extensible link between the circuitry and the or each strain gauge.

17. The pig of claim 13, comprising at least one extensible link between functional units of the circuitry.

18. The pig of claim 1, wherein the or each strain gauge is energised by an on-board power unit.

19. The pig of claim 1, wherein the or each strain gauge comprises an optical fibre or a composite wire or thread.

20. The pig of claim 1, wherein the body is radially compressible by at least 30% of its original diameter without plastic deformation.

21. A method of making a pig for pipeline inspection, the method comprising:
    supporting at least one strain gauge in a mould extending transversely with respect to a central longitudinal axis of the mould;
    submerging the or each strain gauge in a liquid matrix material; and
    setting the matrix material to form a resiliently compressible body of the pig that embeds the or each strain gauge;
    wherein the pig is configured to move through a pipeline to inspect the pipeline.

22. The method of claim 21, also comprising:
    supporting circuitry in the mould for receiving signals from the or each strain gauge; and
    submerging the circuitry in the liquid matrix material to embed the circuitry in the body.

23. A method of making a pig for pipeline inspection, the method comprising:
    inserting at least one strain gauge into a recess in a resiliently compressible block, the or each strain gauge extending transversely with respect to a central longitudinal axis of the block;
    submerging the or each strain gauge in a liquid matrix material introduced into the recess; and
    setting the matrix material in the recess to form a resiliently compressible body of the pig that embeds the or each strain gauge;
    wherein the pig is configured to move through a pipeline to inspect the pipeline.

24. The method of claim 23, also comprising:
    inserting circuitry into the recess for receiving signals from the or each strain gauge; and
    submerging the circuitry in the liquid matrix material to embed the circuitry in the body.

25. A method of making a pig for pipeline inspection, the method comprising:
    inserting a unit into a passageway in a resiliently compressible block, the unit being arranged to provide power or to receive strain gauge signals;
    connecting the inserted unit to at least one strain gauge that is embedded in the block and that extends transversely with respect to a central longitudinal axis of the block; and
    closing the passageway behind the unit to form a resiliently compressible body of the pig;
    wherein the pig is configured to move through a pipeline to inspect the pipeline.

* * * * *